(12) United States Patent
Kondo

(10) Patent No.: US 7,834,638 B2
(45) Date of Patent: Nov. 16, 2010

(54) DIFFERENTIAL TRANSMISSION CIRCUIT, DISK ARRAY APPARATUS, AND OUTPUT SIGNAL SETTING METHOD

(75) Inventor: Shuhei Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 429 days.

(21) Appl. No.: 12/047,991

(22) Filed: Mar. 13, 2008

(65) Prior Publication Data

US 2008/0240288 A1    Oct. 2, 2008

(30) Foreign Application Priority Data

Mar. 27, 2007   (JP)   ............... 2007-083085

(51) Int. Cl.
G01R 31/11   (2006.01)
H04B 3/46   (2006.01)
H04L 25/00   (2006.01)

(52) U.S. Cl. .................. 324/533; 324/527; 324/644; 375/297

(58) Field of Classification Search ............... 324/533, 324/644, 527
See application file for complete search history.

(56) References Cited

U.S. PATENT DOCUMENTS

| | | | | |
|---|---|---|---|---|
| 3,771,056 A | * | 11/1973 | Zimmerman | ............... 324/642 |
| 3,911,358 A | * | 10/1975 | Shalyt et al. | ............... 324/523 |
| 4,005,363 A | * | 1/1977 | Mifflin | ............... 324/642 |
| 5,877,631 A | * | 3/1999 | Takahashi | ............... 324/533 |
| 5,905,194 A | * | 5/1999 | Strong | ............... 73/40.5 R |
| 6,124,727 A | * | 9/2000 | Bridgewater et al. | ............... 326/33 |
| 6,798,212 B2 | * | 9/2004 | Stierman et al. | ............... 324/534 |
| 2003/0185308 A1 | * | 10/2003 | Schoenborn | ............... 375/257 |

FOREIGN PATENT DOCUMENTS

| | | |
|---|---|---|
| JP | 1983176560 A | 10/1983 |
| JP | 1993276184 A | 10/1993 |
| JP | 1994130129 A | 5/1994 |
| JP | 1995074606 A | 3/1995 |
| JP | 1997166406 A | 6/1997 |
| JP | 2000181591 A | 6/2000 |
| JP | 2003106804 A | 4/2003 |

OTHER PUBLICATIONS

Japanese Office Action for JP Application No. 2007-083085 mailed Mar. 17, 2009.

* cited by examiner

*Primary Examiner*—Timothy J Dole
*Assistant Examiner*—John Zhu

(57) ABSTRACT

To provide a signal transmitting/receiving apparatus etc. where a cable length can be measured by using a general-purpose cable, without using an interface. A differential transmission circuit by the present invention includes a signal output circuit sending a high-speed differential signal and a pulse wave; a signal input circuit including a terminating resistor; a bias controller controlling a bias voltage on a transmission path; a terminating resistance controller disconnecting the terminating resistor on sensing a bias voltage and connecting it on sensing no bias voltage, by a bias sensing circuit; a sensing input circuit sensing a pulse wave reflected at the signal input circuit; and an output setting controller setting an electric characteristic of a signal outputted from the signal output circuit by a propagation time from sending the pulse wave by the signal output circuit to receiving the reflected pulse wave by the sensing input circuit.

10 Claims, 2 Drawing Sheets

US 7,834,638 B2

DIFFERENTIAL TRANSMISSION CIRCUIT, DISK ARRAY APPARATUS, AND OUTPUT SIGNAL SETTING METHOD

CROSS-REFERENCE TO RELATED APPLICATION

This application is based upon and claims the benefit of priority from Japanese patent application No. 2007-083085, filed on Mar. 27, 2007, the disclosure of which is incorporated herein in its entirety by reference.

BACKGROUND OF THE INVENTION

1. Field of the Invention

The present invention relates to a technique for inputting/outputting a high-speed differential signal, in particular, a differential transmission circuit capable of determining a cable length without an exclusive interface by using a general-purpose cable.

2. Description of the Related Art

In a high-speed differential signaling where a small potential difference, such as a few hundred millivolt, is sent and received as a signal through a cable, a sufficiently high driving performance is required to be set considering a signal attenuation caused by a transmission through a transmission cable. On the other hand, considering an effect of EMI (Electromagnetic interference), the driving performance is preferred to be as low as possible to reduce emission of an electromagnetic wave. Accordingly, "a preferably low setting value with which communication can be performed normally even if a signal is attenuated on a transmission cable" is to be selected for the driving performance to output a signal. However, an attenuation amount of a signal cannot be specified uniquely in the cable transmission when a length of the connected cable is unknown. In such a case, it becomes difficult to provide an appropriate setting value suited to the transmission.

To solve this problem, in the Japanese Patent Application Laid-open No. 2000-181591 (Patent Document 1), for example, a signal transmission cable includes another exclusive interface inside thereof for determining a cable length, and optimal outputting control is performed according to the cable length obtained by the interface.

A problem in the technique disclosed by the Patent Document 1 is that a special cable needs to be prepared because the exclusive interface has to be included in a signal cable, and a general-purpose cable with a low price cannot be used. If the general-purpose cable is used, another interface for measuring a cable length is required, and a system becomes enlarged.

SUMMARY OF THE INVENTION

Therefore, an exemplary object of the invention is to provide a differential transmission circuit capable of using a general-purpose cable to measure a cable length, with which an interface for measuring the cable length is not necessary therefor.

The differential transmission circuit according to the exemplary aspect of the invention includes: a signal output circuit connected to one end of a transmission path for sending a high-speed differential signal and a pulse wave; a signal input circuit connected to the other end of the transmission path for receiving the high-speed differential signal and the pulse wave, provided with a terminating resistor; a bias controller for controlling a bias voltage on the transmission path; a bias sensing circuit for sensing an existence of a bias voltage; a terminating resistance controller for disconnecting the terminating resistor when the bias sensing circuit senses a bias voltage and for connecting the terminating resistor when the bias sensing circuit does not sense a bias voltage; a sensing input circuit for sensing a pulse wave reflected by the signal input circuit; and an output setting controller for setting an electric characteristic of a signal outputted by the signal output circuit according to a propagation time which is a period from a time at which the signal output circuit sends a pulse wave to a time at which the sensing input circuit receives the reflected pulse wave.

In a method for controlling the connection and the disconnection of the terminating resistor, a bias voltage is to be applied freely on the transmission path by the bias controller in the transmitting side. The terminating resistance controller reads out the existence of the bias voltage to control the connection and the disconnection of the terminating resistor. That is, a bias value at the transmission path can be used for controlling the connection and the disconnection of the terminating resistor. Thus, a specialized cable is not required and a general-purpose cable can be used.

A disk array apparatus and an output signal setting method according to another exemplary aspect of the invention can also solve the problem as well as the differential transmission circuit according to the exemplary aspect of the invention.

DESCRIPTION OF EXEMPLARY EMBODIMENTS

A structure and an operation of a disk array apparatus 4 which is one exemplary embodiment of the present invention will be explained with reference to the drawings.

Figure 1:
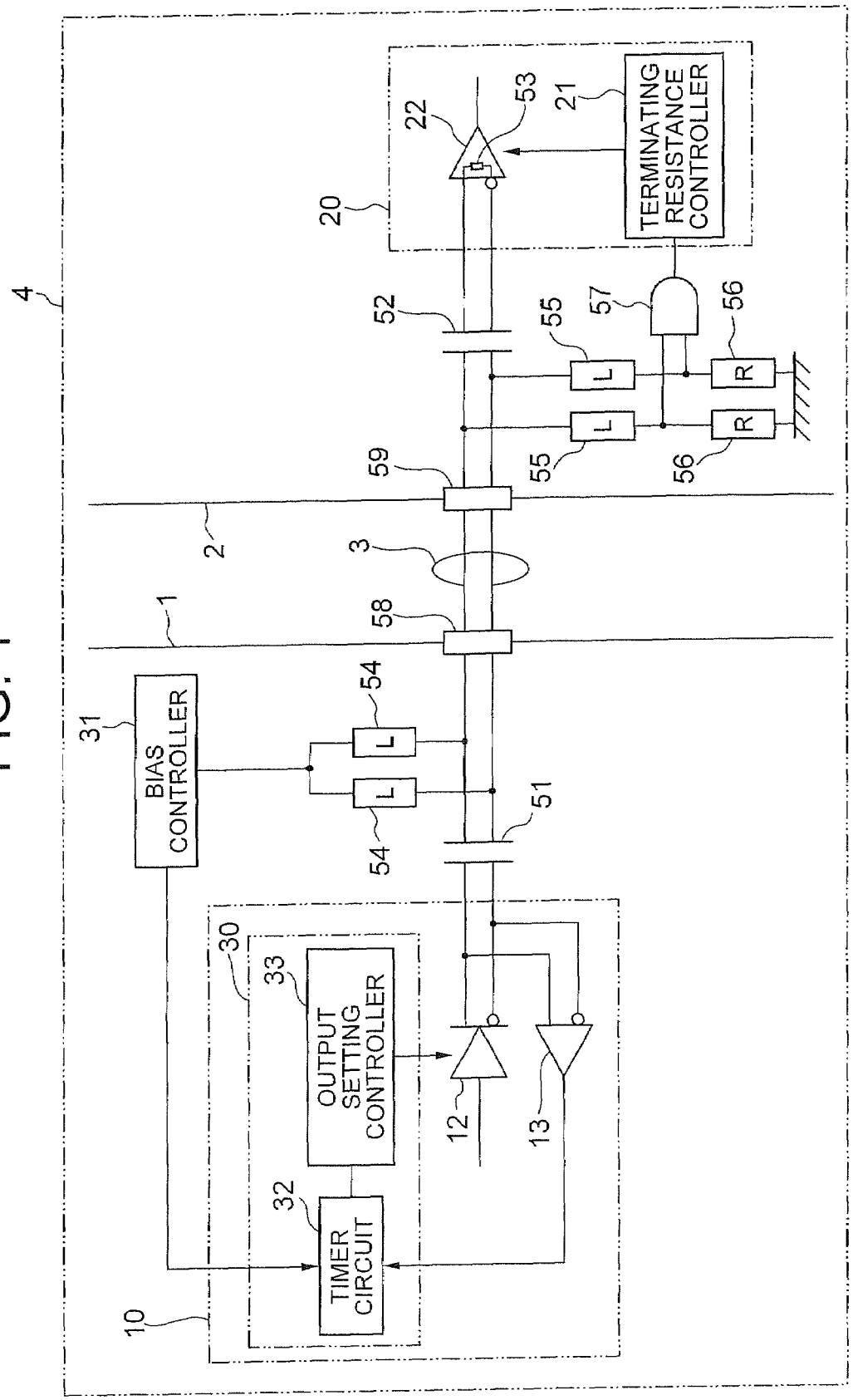
FIG. 1 is a diagram showing a structure of a differential transmission circuit in a disk array apparatus which is one exemplary embodiment of the invention.

FIG. 1 is a block diagram showing the disk array apparatus 4. This drawing illustrates only components relating to the differential transmission path.

The disk array apparatus 4 includes a transmitting side device 1 and a receiving side device 2 both of which are connected with each other through a transmission cable 3 and connectors 58 and 59.

Figure 2:
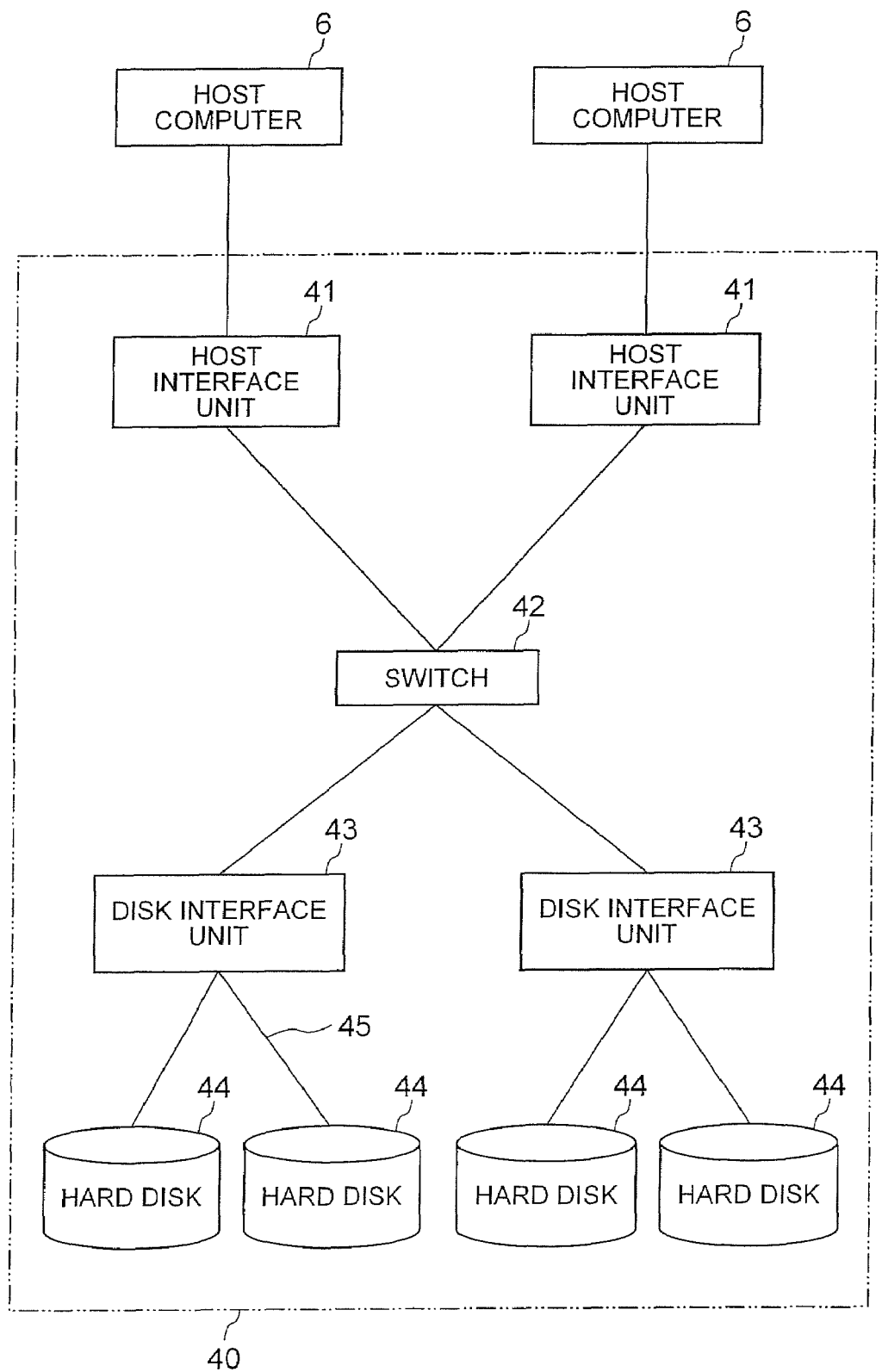
FIG. 2 is a diagram showing a whole structure of the disk array apparatus.

FIG. 2 is a diagram showing a structure of a general disk array apparatus 40. The disk array apparatus 40 includes a host interface unit 41 for transmitting/receiving data to/from a host computer 6, a disk interface unit 43 for transmitting/receiving data to/from a hard disk 44, and a switch 42 for controlling communication between the host interface unit 41 and the disk interface unit 43. In this drawing, in a case where data is written in the hard disk 44 for example, the disk interface unit 43 corresponds to the transmitting side device 1 in FIG. 1, the hard disk 44 corresponds to the receiving side device 2 in FIG. 1, and a cable 45 connecting the disk interface unit 43 and the hard disk 44 corresponds to the transmission cable 3 respectively.

The transmitting side device 1 includes an output unit 10 including a signal output circuit 12, a sensing input circuit 13, a timer circuit 32, and an output setting controller 33; a bias controller 31; a coupling capacitor 51; and two coils 54.

The receiving side device 2 includes an input unit 20 including the terminating resistance controller 21 and a signal input circuit 22; a coupling capacitor 52; two coils 55; two resisters 56; and a bias sensing circuit 57.

The signal output circuit 12 of the output unit 10 in the transmitting side device 1 is a transmission terminal of a differential amplifier circuit, and the signal input circuit 22 of the input unit 20 in the receiving side device 2 is a reception terminal of the differential amplifier circuit, and these devices are connected by the transmission cable 3 to be the differential transmission circuit targeted by the exemplary aspect of the present invention, assuming specifically a high-speed serial transmission, such as an SAS (Serial Attached SCSI (Small Computer System Interface)) or a PCI Express (Peripheral Component Interconnect Express).

The transmission cable 3 is a general-purpose cable composed of a pair of signal lines, and coupling capacitors 51 and 52 are disposed at both ends thereof for allowing a bias voltage to be applied.

The signal output circuit 12 sends a high-speed differential signal and a pulse wave for measuring a cable length to the signal input circuit 22 through the transmission cable 3.

The sensing input circuit 13 senses the pulse wave reflected at the signal input circuit 22.

The bias controller 31 applies a bias voltage on a path of the transmission cable 3 when the device is started. The coil 54 is disposed in between the bias controller 31 and the transmission cable 3, and the coil 55 is disposed in between the bias sensing circuit 57 and the transmission cable 3 respectively, so that signal propagation is not influenced when the bias controller 31 applies a bias voltage on the path 3. The coil 55 is grounded through the resistor 56.

The timer circuit 32 is connected to the sensing input circuit 13, and measures a period from a time at which the signal output circuit 12 sends a pulse wave to a time at which the sensing input circuit 13 senses a reflected pulse wave (hereinafter, referred to as a "propagation time").

The output setting controller 33 calculates a length of the transmission cable 3 according to the propagation time, and performs a setting relating to an electric characteristic of the output signal sent by the signal output circuit 12, according to the length.

The signal input circuit 22 receives the signal sent by the signal output circuit 12. The signal input circuit 22 includes the terminating resistor 53. The terminating resistor 53 is connectable or disconnectable. While the terminating resistor 53 is disconnected, a received signal is reflected toward the signal output circuit 12.

The bias sensing circuit 57 senses the bias voltage applied on the transmission cable 3.

The terminating resistance controller 21 disconnects the terminating resistor 53 when the bias sensing circuit 57 senses a bias voltage, and connects the terminating resistor 53 when a bias voltage is not sensed.

Next, operations of the disk array apparatus 4 will be explained.

Generally, when a device is started, configuration settings are performed firstly at a signal output circuit of the device including a high-speed differential interface to set up such as output amplitude setting, pre-emphasis setting, and the like relating to an electric characteristic of the output signal. Before the setting of the configurations, following operations according to the exemplary aspect of the invention will be performed for determining a cable length so as to provide optimal setting in accordance with the cable length.

The bias controller 31 of the transmitting device 1 applies a bias voltage, for example of 3.3V, on a path of the transmission cable 3 on which the bias voltage is not applied usually.

The terminating resistance controller 21 included in the input unit 20 disconnects the terminating resistor 53 when the bias sensing circuit 57 determines that the bias is applied on the line.

Next, the signal output circuit 12 outputs a pulse wave. A reception terminal of the transmission path becomes a non-terminal because the terminating resistor 53 is disconnected, and the total internal reflection occurs at the signal input circuit 22. The sensing input circuit 13 senses this reflected wave.

The timer circuit 32 of the transmitting side controller 30 receives this sensing timing, and outputs a time period from emission of the pulse to sensing of the reflected wave (the propagation time). The output setting controller 33 receives the above and determines a length of the transmission cable 3 by multiplying the propagation time and a propagation speed of the signal. The cable length can be obtained as described above, and an optimal setting value for the signal output circuit 12 with respect to the cable length is stored in the output setting controller as a table so as to set the signal output circuit 12 optimally.

After completing the setting of the optimal configuration, the bias controller 31 reduces the bias voltage from previously applied 3.3V to 0.0V. Sensing the reduction, the bias sensing circuit 57 connects the terminating resistor 53 by using the terminating resistance controller 21.

In the disk array apparatus 4, the connection and the disconnection of the terminating resistor 53 is controlled through the transmission cable 3. The terminating resistor 53 is disposed for preventing the reflection at the reception terminal of the transmission path. Accordingly, if there is not this resistor, the reception terminal becomes open and the total internal reflection occurs with a signal and a large reflection wave is generated.

Utilizing this characteristic, the terminating resistor 53 is connected to suppress the reflection when a usual signal transmission is to be performed, and the terminating resistor 53 is disconnected to generate the reflection wave on purpose when a detection of a cable length is to be performed. This reflected wave is received by the sensing input circuit 13 and the propagation time thereof is measured, so that the output setting controller 33 determines a length of the transmission path and performs an optimal output setting in response to the length.

As for a method for controlling the connection and disconnection of the terminating resistor 53, the bias controller 31 in the transmitting side can apply a bias voltage on the transmission path freely. Then, the terminating resistance controller 21 reads out an existence of the bias voltage so as to control the connection and the disconnection of the terminating resistor 53.

Consequently, the cable length can be determined without preparing a specialized cable or another interface. This means that an expensive specialized cable is not required for the transmission cable 3, and that a low-priced, general-purpose cable can be used.

According to the aforementioned signal transmitting/receiving device, the terminating resistor is controlled its connection and disconnection through the signal transmission path. The terminating resistor is disposed for preventing reflection at a reception terminal of the transmission path. Therefore, if this resistor is not connected and the reception terminal becomes open, total internal reflection occurs with a signal and a large reflected wave is generated.

Using this characteristic, a terminating resistor is to be connected so as to suppress the reflection at a usual signal transmission, while the terminating resistor is to be disconnected so as to generate the reflection on purpose at detecting a cable length. The sensing input circuit receives the reflected wave and its propagation time is measured, then the output setting controller determines a length of the transmission path and performs an optimal output setting in accordance with the length.

As an exemplary advantage according to the invention, a cable length can be determined without preparing a specialized cable nor an interface for measuring a cable length.

According to the aforementioned exemplary embodiment, the disk array apparatus is used for an example, but the exemplary aspect of the present invention can be applied generally to apparatuses for transmitting/receiving a high-speed differential signal, for example, a personal computer where data is transmitted between a motherboard and a hard disk device.

Further, the cable transmission between devices has been explained, but the exemplary aspect of the present invention can be also applied in the same manner to backplane transmission by a bus or a chip interconnecting between substrates in a device, such as a signal transmission between the switch 42 and the disk interface unit 43 in FIG. 2.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A differential transmission circuit comprising:
a signal output circuit connected to one end of a transmission path for sending a high-speed differential signal and a pulse wave;
a signal input circuit connected to the other end of the transmission path for receiving the high-speed differential signal and the pulse wave, wherein a terminating resistor is included;
a bias controller for controlling a bias voltage on the transmission path;
a bias sensing circuit for sensing an existence of the bias voltage;
a terminating resistance controller for disconnecting the terminating resistor when the bias sensing circuit senses the bias voltage, connecting the terminating resistor when the bias sensing circuit does not sense the bias voltage;
a sensing input circuit for sensing the pulse wave reflected at the signal input circuit; and
an output setting controller for setting an electric characteristic of a signal outputted from the signal output circuit according to a propagation time which is a period from a time at which the signal output circuit sends the pulse wave to a time at which the sensing input circuit receives the reflected pulse wave.

2. The differential transmission circuit, as claimed in claim 1, wherein the output setting controller performs the setting with reference to a table storing the propagation time and content of the setting in an associated manner.

3. The differential transmission circuit, as claimed in claim 1, wherein the transmission path is a cable for connecting a transmitting side device and a receiving side device.

4. The differential transmission circuit, as claimed in claim 1, wherein the transmission path is used for backplane transmission.

5. A differential transmission circuit comprising:
a signal output means connected to one end of a transmission path, for sending a high-speed differential signal and a pulse wave;
a signal input means connected to the other end of the transmission path, for receiving the high-speed differential signal and the pulse wave, wherein a terminating resistor is included;
a bias control means for controlling a bias voltage on the transmission path;
a bias sensing means for sensing an existence of the bias voltage;
a terminating resistance control means for disconnecting the terminating resistor when the bias sensing means senses the bias voltage, connecting the terminating resistor when the bias sensing means does not sense the bias voltage;
a sensing input means for sensing the pulse wave reflected at the signal input means; and
an output setting control means for setting an electric characteristic of a signal outputted from the signal output means according to a propagation time which is a period from a time at which the signal output means sends the pulse wave to a time at which the sensing input means receives the reflected pulse wave.

6. A disk array apparatus comprising a differential transmission circuit, wherein
the differential transmission circuit includes:
a signal output circuit connected to one end of a transmission path for sending a high-speed differential signal and a pulse wave;
a signal input circuit connected to the other end of the transmission path for receiving the high-speed differential signal and the pulse wave, wherein a terminating resistor is included;
a bias controller for controlling a bias voltage at the transmission path;
a bias sensing circuit for sensing an existence of the bias voltage;
a terminating resistance controller for disconnecting the terminating resistor when the bias sensing circuit senses the bias voltage and connecting the terminating resistor when the bias sensing circuit does not sense the bias voltage;
a sensing input circuit for sensing the pulse wave reflected at the signal input circuit; and
an output setting controller for setting an electric characteristic of a signal outputted from the signal output circuit according to a propagation time which is a period from a time at which the signal output circuit sends the pulse wave to a time at which the sensing input circuit receives the reflected pulse wave.

7. An output signal setting method comprising:
applying a bias voltage on a transmission path one end of which is connected to a signal output circuit and the other end of which is connected to a signal input circuit including a terminating resistor;
sensing the bias voltage at the other end and disconnecting the terminating resistor from the signal input circuit;
sending a pulse wave from the signal output circuit and measuring a propagation time which is a period from the sending to sensing of the pulse wave reflected at the signal input circuit at the one end;
setting an electric characteristic of a high-speed differential signal outputted from the signal output circuit according to the propagation time;
eliminating the bias voltage;

sensing the elimination of the bias voltage at the other end and connecting the terminating resistor from the signal input circuit.

8. The output signal setting method, as claimed in claim 7, wherein the setting is performed with reference to a table storing the propagation time and content of the setting in an associated manner.

9. The output signal setting method, as claimed in claim 7, wherein a cable connecting a transmitting side device and a receiving side device is used as the transmission path.

10. The output signal setting method, as claimed in claim 7, wherein a transmission path used for backplane transmission is used as the transmission path.

\* \* \* \* \*